Aug. 3, 1965   R. L. FENNER   3,198,011
MOISTURE SENSING DEVICE

Filed June 1, 1960   5 Sheets-Sheet 1

INVENTOR.
Ralph L. Fenner
BY
Attorneys

Aug. 3, 1965

R. L. FENNER 3,198,011

MOISTURE SENSING DEVICE

Filed June 1, 1960

INVENTOR
Ralph L. Fenner

BY

ATTORNEY

United States Patent Office 3,198,011
Patented Aug. 3, 1965

3,198,011
MOISTURE SENSING DEVICE
Ralph L. Fenner, 45 Harrison Ave., Sausalito, Calif.
Filed June 1, 1960, Ser. No. 33,319
6 Claims. (Cl. 73—337.5)

This invention relates to a moisture sensing device and more particularly to a moisture sensing device for measuring moistness or the amount of moisture in a fluid such as a gas or a liquid.

Moisture measuring devices such as a hygrometers which are presently on the market have been found to be particularly inadequate when attempting to measure high or low moisture contents. The same has been true when attempting to measure a large range of moisture content as, for example, from zero moisture content to the water filled state in gaseous or liquid systems. Present day moisture measuring devices also have many additional disadvantages such as rapid deterioration and the requirement for frequent recalibration. There is, therefore, a need for a moisture measuring device which overcomes the above named disadvantages.

In general, it is an object of the present invention to provide a moisture sensing device which overcomes the above named disadvantages and, in addition, makes possible the measurement of moisture content from zero moisture to the water filled state in gaseous and liquid systems.

Another object of the invention is to provide a moisture sensing device of the above character which retains its sensitivity at very high and very low temperatures.

Another object of the invention is to provide a moisture sensing device of the above character which responds accurately for long periods of time without recalibration.

Another object of the invention is to provide a moisture sensing device of the above character which accurately responds to moisture levels approaching zero relative humidity in the vapor phase.

Another object of the invention is to provide a moisture sensing device of the above character which accurately responds to moisture levels associated with 100 percent relative humidity in the vapor phase.

Another object of the invention is to provide a moisture sensing device of the above character which accurately responds to moisture in the liquid phase.

Another object of the invention is to provide a moisture sensing device of the above character which accurately responds to the proportion of liquid water in a zone containing the water and non-polar liquids.

Another object of the invention is to provide a moisture sensing device which has a relatively large response for relatively small changes in moisture content.

Another object of the invention is to provide a moisture sensing device of the above character which will provide an accurate measurement of relative humidity under an oscillating vapor pressure condition.

Another object of the invention is to provide a moisture sensing device of the above character which can be utilized for measuring the moisture content of fibers.

Another object of the invention is to provide a moisture sensing device of the above character which accurately responds to the hysteresis loop effect at equilibrium moisture content in wood fiber under adsorb and desorb moisture conditions.

Another object of the invention is to provide a moisture sensing device of the above character which is very durable and is not subject to deterioration under extremely dry or extremely wet conditions.

Another object of the invention is to provide a moisture sensing device of the above character in which the moisture sensitive element can be operated in a restrained condition.

Another object of the invention is to provide a moisture sensing device of the above character which is relatively simple and economical to construct.

Additional objects and features of the invention will appear from the following description in which the preferred embodiments have been set forth in detail in conjunction with the accompanying drawings.

Referring to the drawings.

In general, my invention consists of the use of a unique moisture sensitive element which is capable of sensing relative moisture content. The unique moisture sensitive element is comprised of two superimposed layers, one of which is relatively sensitive to moisture and the other of which is relatively insensitive to moisture; or in other words, one which absorbs moisture and the other of which is relatively impervious to moisture. Changes in moisture content in the moisture absorbing layer cause deformation of the moisture sensitive element and give an indication of the moisture content in the moisture absorbing layer. Means is provided which is responsive to the changes in the deformation or configuration of the moisture sensitive element to give an indication of the moisture content in the moisture sensitive element.

As described in my copending application Serial No. 33,288, filed June 1, 1960 now Patent 3,135,117, I have found that the tail-like appendages of the seeds of the genus Erodium have characteristics which particularly adapt them for use as moisture sensitive elements. In particular, species Texanum, Macrophyllum, Cygnorum, Botrys, Moschutum, and Cicutarinum yield tail-like appendages which have a length and other characteristics which particularly adapt them for use as moisture sensitive elements. The species Botrys is particularly useful because it has a length of five to eight centimeters. When wet, it is practically straight, and when dry it has approximately 16 turns. The tail-like appendage is comprised of two superimposed contiguous layers, one of which readily absorbs moisture, and the other of which is relatively impervious to moisture. The layer which readily absorbs moisture is comprised of translucent, extremely long cells, whereas the layer which is relatively impervious to moisture appears to be comprised of relatively short cells.

The proper method for preparing the tail-like appendages from the seeds of the genus Erodium is clearly explained in my copending application Serial No. 33,288, filed June 1, 1960. As explained in that application, the tail-like appendage can be made more sensitive by splitting the tail-like appendage longitudinally into two separate parts so that when it dries there are still spaces between the separate turns which form the helix. As also pointed out in my copending application, the tail-like appendage can be made more sensitive to changes in moisture content by coating it with a deliquescent material.

One moisture sensitive device incorporating this unique moisture sensitive element is shown in FIGURES 1 through 4. It consists of a generally rectangular case 11 which is supported by a V-shaped stand 12. A framework 13 extends across the front of the case 11 and is secured thereto by suitable means such as screws 14. A pair of rods 16 is mounted on the framework 13 and extends rearwardly from the framework 13 in planes which are generally parallel to the side walls of the case 11. A pair of spaced apart plates 17 and 18 is fixed to the rods 16. Three small rods 19 are secured to the plates 17 and 18 and extend in generally the same direction as the rods 16. A small plate 21 of suitable configuration such as the triangular shape shown is slidably mounted on the rods 19 for a purpose hereinafter described.

The moisture sensitive element 22 is of a type hereinbefore described and is mounted within the case 11. As shown, the tail end 22a of the element or tail-like appendage 22 is secured to the plate 21 of suitable material such as "Mylar" in a suitable manner such as by the use of rubber cement 23. The tail end 22a is attached in such a manner that the main body of the element 22 extends along an axis which is generally equidistant from the rods 16 and from the three rods 19. The seed end 22b of the tail-like appendage 22 is secured to a shaft 24 in a manner hereinafter described in detail in conjunction with the description of the moisture sensing device shown in detail in FIGURES 5 through 9. The shaft 24 is connected to a gear train 26 having a suitable reduction rate such as 30:1. The gear train is connected to a pointer 27 which may be read against a properly calibrated dial 28.

Figure 1:
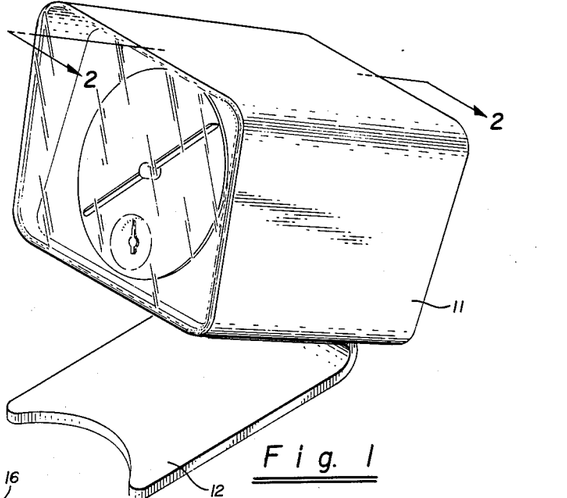
FIGURE 1 is a perspective view of a moisture sensing device incorporating my invention.
Figures 2, 3, 4:
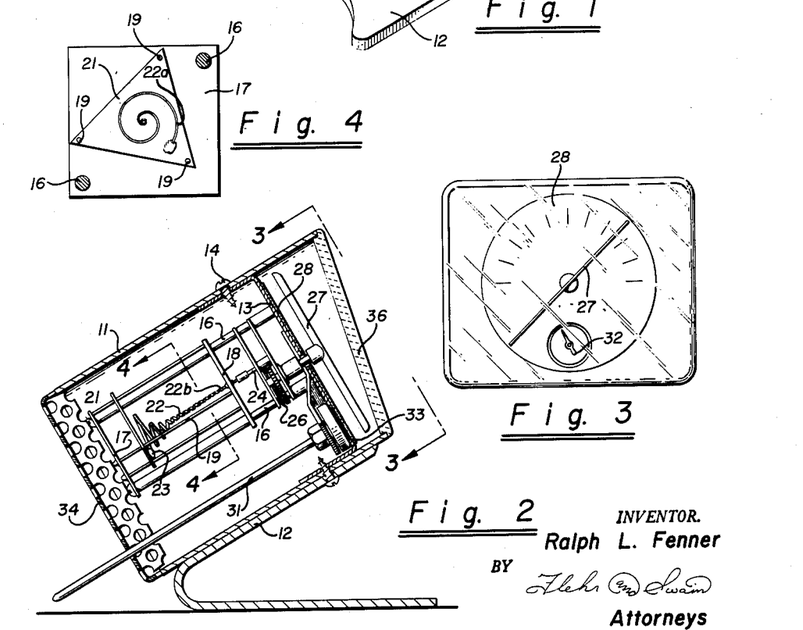
FIGURE 2 is a cross-sectional view taken along the line 2—2 of FIGURE 1.
FIGURE 3 is a view looking along the line 3—3 of FIGURE 2.
FIGURE 4 is a cross-sectional view taken along the line 4—4 of FIGURE 2.

A thermometer 31 has been mounted on the framework 31 and is provided with an indicating hand 32 which can be seen through an opening 33 provided in the dial 28. The thermometer 31 forms no part of the present invention but merely has been included so that a temperature reading can be made at the same time that a moisture reading is taken.

The case 11 is provided with a perforated back cover 34 and a transparent front facing member 36.

Operation of the moisture sensing device shown in FIGURES 1 through 4 may now be briefly described as follows. As explained in my copending application Serial No. 33,288, filed June 1, 1960, the moisture sensitive element 22 is of a type which uncoils or unwinds as more and more moisture is absorbed and which becomes more tightly wound as it becomes drier. Now let it be assumed that the moisture content in the air is increasing and that moisture absorbing layer senses this change in the moisture content in the air and causes the moisture sensitive element 22 to unwind. Since the tail end of the tail-like appendage is secured to the plate 21, it is apparent that the plate 21 cannot rotate. Therefore, as the tail-like 22 appendage 22 unwinds, torque is applied to the shaft 24 to operate the gear train 26 and to drive the pointer 27 in a counterclockwise direction as viewed in FIGURE 3. It has been found that the forces generated by the element 22 in winding and unwinding are more than adequate to drive the gear train 26 and the pointer 27 associated therewith.

As pointed out in my copending application Serial No. 33,288, filed June 1, 1960, as the moisture sensitive elements 22 unwinds, it tends to expand longitudinally. This longitudinal expansion is accommodated within the device by means of the plate 21 which is slidably mounted on the rods 19. As the moisture sensitive element unwinds, the plate 21 is urged rearwardly on the rods 19 as it unwinds. Conversely, when the moisture sensitive element 22 is sensing drier air, the plate 21 is moved forwardly as the number of turns or twists in the moisture sensitive element 22 increases.

Calibration of the moisture sensing device is normally accomplished after the device has been completely assembled. The gear train ratio is selected so that the complete winding and unwinding of the moisture sensitive element will cover approximately 50 percent of the dial face. The dial face is then calibrated from zero moisture content to complete saturation.

The particular means shown for mounting the moisture sensitive element 22 in the device shown in FIGURES 1 through 4 is particularly advantageous in that it permits use of a device which is relatively shallow. For example, as can be seen from the drawing, it can be of the type which is particularly adapted for desk use in that it need only have a depth of three to four inches. This relatively shallow depth is made possible because the seed end of the tail-like appendage is secured directly to the gear train and the tail end of the tail-like appendage is secured to the thin "Mylar" plate which slides back and forth on the three rods 19. Movement of the plate 21, therefore, clearly accommodates any expansion or contraction of the moisture sensitive element 22.

Another embodiment of my moisture sensing device is shown in FIGURES 5 through 9 and may be called the probe type. It consists of a case 41 which provides a sensing chamber 42, an expansion chamber 43, and a head 44. The head 44 is formed by a cylindrical cup-shaped member 46 which has joined to it an integral tubular extension 47. The members 46 and 47 are formed of a suitable material such as aluminum. The sensing chamber 42 is formed by a tubular member 48 formed of suitable material such as fiberglass. The member 48 has one end threaded to the tubular member 47 as shown. It is provided with a plurality of elongate slots 49 extending longitudinally of the same and spaced circumferentially around the same to facilitate the passage of air over the moisture sensitive element 51.

Figures 5, 6, 7, 8, 9:
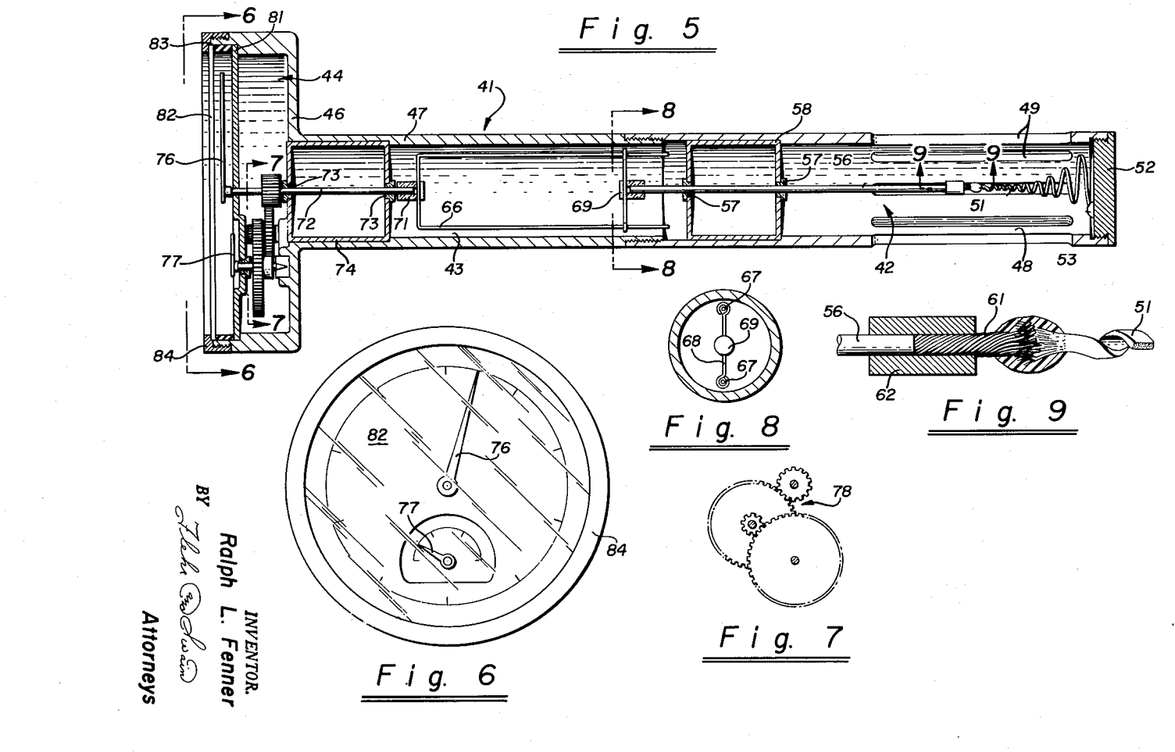
FIGURE 5 is a cross-sectional view of another embodiment of my moisture sensing device.
FIGURE 6 is a view along the line 6—6 of FIGURE 5.
FIGURE 7 is a cross-sectional view taken along the line 7—7 of FIGURE 5.
FIGURE 8 is a cross-sectional view taken along the line 8—8 of FIGURE 5.
FIGURE 9 is a cross-sectional view taken along the line 9—9 of FIGURE 5.

The tail end of the tail-like appendage or moisture sensitive element 51 is secured with rubber cement to a cap 52 threaded into the end of the tubular member 48. The tail end is secured so that the seed end of the tail-like appendage is centrally disposed within the chamber 42.

A rod 56 of suitable material such as glass is rotatably and slidably mounted within the chamber 42 by means of a pair of nylon bearings 57 carried by the cylindrical housing 58 supported within the tubular member 48. Particularly novel means is provided for making the connection between the rod 56 and the seed end of the tail-like appendage 51 as shown particularly in FIGURE 9. In making this connection, it is desirable that the connection be such that there will be very little, if any, displacement of the shaft 56 as the element 51 winds and unwinds. I have found that such a connection can be made by first mascerating the seed end of the element 51 while it is in a wet condition to disassociate the fibers forming the end of the element. It is particularly important that the fibers making up the moisture adsorbing layer be separated from the fibers forming the layer which is relatively insensitive to moisture. I found that this mashing or disassociation operation can be most readily accomplished by the use of a hemostat. A small cable 61 of fine stranded wire is then incorporated in the mascerated end of the element 51 in the manner shown in FIGURE 9 so that the strands of wire become closely interrelated with the separate fibers of the element 51. The fibers and the strands are then more thoroughly enmeshed by rolling the same between the fingers of the hand. Thereafter, a suitable adhesive such as Eastman 910 is appled to this joint. The adhesive sets up immediately and bonds the element 51 to the cable 61. The cable 61 is connected to the rod 56 by suitable means such as the sleeve 62 shown.

Means is provided to compensate for the longitudinal expansion and contraction of the element 51 and to thereby remove any tendency to restrain operation of the moisture sensing element. Such means is provided in the expansion chamber 43 and consists of a U-shaped male fork member 66 which extends through openings 67 provided in opposite ends of a female member 68 mounted in a cap 69 fixed to the upper or forward end of the rod 56.

The upper end of the rod is carried by a coupling 71 fixed to a rod 72 rotatably mounted in nylon bearings 73 carried by cylindrical housing 74 mounted within the tubular extension 47. The rod 72 is connected to a pointer 76 and also drives another pointer 77 through a jeweled gear train 78. A dial 81 is mounted within the cylindrical head 46. A dial glass 82 is also mounted within the cylindrical head 46 and is spaced from the dial face 81 and the pointers 76 and 77 by a sealing ring 83. The dial glass, the sealing ring, and the dial face are held in place by a cover plate 84.

Operation of this embodiment of my moisture sensing device is very similar to that of the moisture sensing device shown in FIGURES 1 through 4. The reduction ratio for the gear train 78 is such that the main pointer 76 makes 30 turns for each turn of the pointer 77. With two such pointers, very accurate readings can be made. It is, however, readily apparent that, if desired, other ratios can be utilized. It was found that the torque output from the moisture sensing element 51 was more than adequate to drive the device shown in the drawings. It will be noted, however, that every attempt was made to minimize any friction which would tend to hinder rotation of the pointers 76 and 77. The fork type coupling arrangement shown in the expansion chamber readily accommodates longitudinal expansion and contraction of the moisture sensing element 51 as it winds and unwinds with very little, if any, effect on the radical action of the moisture sensitive element 51. The connection made between the seed end of the element 51 and the rod 56 is such that there is very little, if any, sidewise movement of the rod 56 as the element 51 winds and unwinds.

The use of fiberglass for the sensing chamber 42 has been found to be advantageous over metal in that there is less likelihood for moisture to condense on the fiberglass material. It is only necessary that sufficient openings be provided in the fiberglass so that air can pass readily over the moisture sensitive element.

Figures 10, 13, 14:
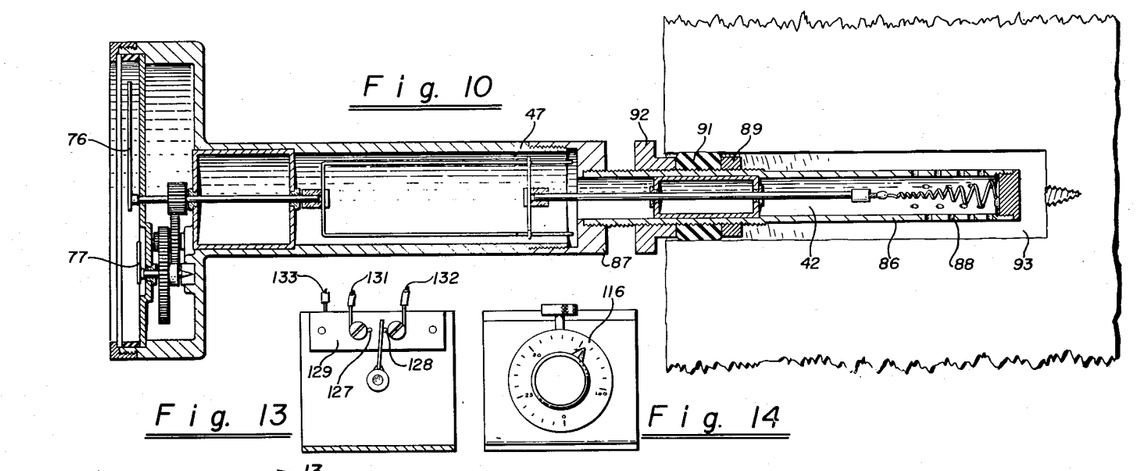
FIGURE 10 is a cross-sectional view of another embodiment of my moisture sensnig device.
FIGURE 13 is a cross-sectional view taken along the line 13—13 of FIGURE 12.
FIGURE 14 is a front elevational view looking along the line 14—14 of FIGURE 12.

Another embodiment of my moisture sensing device is shown in FIGURE 10. This is also of the probe type similar to that shown in FIGURES 5 through 9 but is particularly adapted for measuring the moisture content inside logs or trees. In this embodiment, the sensing chamber 42 is enclosed within a tubular member 86 of a suitable material such as brass, which is threaded into a cap 87. The cap 87 is threaded onto the tubular extension 47. The tubular member 86 is provided with a plurality of openings 88 to permit air to circulate over the moisture sensitive element 51. The upper portion of the tubular member 86 is threaded as shown. A retaining nut 89 is threaded on this threaded portion of the member 86. A retaining washer 91 of suitable material such as rubber is also mounted on the threaded portion and is adapted to be engaged by a compression nut 92.

In utilizing the moisture sensitive device shown in FIGURE 10, a hole 93 of a size slightly greater than the washer 91 when released is first bored into the log or tree to a suitable depth. The moisture sensing device is inserted into the member 93. Thereafter the compression nut 92 is tightened to compress the washer 91 against the sidewall forming the hole 93 to effectively seal the opening and at the same time hold the moisture sensing device in place. Indicators 76 and 77 will give a reading which is proportional to the moisture content in the air in the sealed chamber and which in turn is proportional to the moisture content of the surrounding wood. As explained in my co-pending application Serial No. 33,288, filed June 1, 1960, in order to make the exact determination of the moisture content it is necessary to know whether the moisture content in the air is increasing or decreasing so that it can be determined whether the desorb or absorb curves should be utilized.

When making such a reading, it is necessary to consider that when the moisture sensitive element itself is 50 percent saturated, the wood fiber of which an analysis is being made is also 50 percent saturated. Thus, if the wood fiber being analyzed is Ponderosa pine which is approximately 32 percent moisture at saturation, the Ponderosa pine would be comprised of 16 percent moisture by weight. As is well known to those skilled in the art, such information is very useful in determining the likelihood of occurrence of forest fires.

In general, my moisture sensitive device measures the relative amount of moisture in the surrounding materials. The relative amount of moisture in the materials effects the amount of moisture in the air and the amount of moisture in the air effects the moisture sensitive element in my moisture sensing device.

Figure 11:
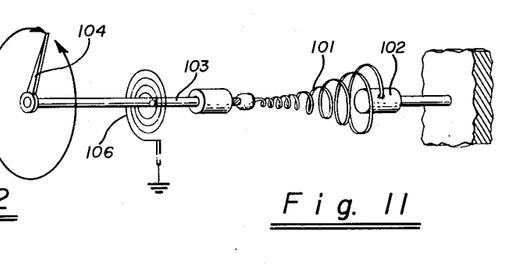
FIGURE 11 is an isometric view with certain parts broken away of another embodiment of my moisture sensing device.

Another embodiment of my moisture sensing device is shown in FIGURE 11 and can be termed the "restrained" type. It consists of a moisture sensitive element 101 which has its tail end fastened to the post 102 and its seed end connected to a rod 103 in a manner similar to that hereinbefore described. The rod 103 drives the pointer 104. Restraining means is connected to the shaft 103 and consists of a spiral spring 106. The device shown in FIGURE 11 is calibrated so that zero torque is applied to the rod 103 by the tail-like appendage 101 at zero moisture content. As the moisture content of the style 101 increases and the tail-like appendage begins to unwind, torque is applied to the rod 103 against the force of the spring 106. As the unwinding continues, the amount of rotation of the pointer 104 will be markedly less than that in previous embodiments because of the restraining action of the spring 106. In such a device it has been found that several hundred grams of torque are applied by the moisture sensitive element 101. It normally is desirable to calibrate the dial for the pointer 104 so that full scale deflection occurs in approximately 180° of rotation of the pointer 104.

Although no means has been provided to accommodate the longitudinal expansion and contraction of the moisture sensitive element 101, it is readily apparent that means similar to that provided in the previous embodiments may be utilized if desired.

For restrained operation, it has been found desirable to utilize the split type of tail-like appendage hereinbefore described so that there is adequate circulation of air through the tail-like appendage. This is because the restrained operation has a tendency to prevent the tail-like appendage from uncoiling.

Figure 12:
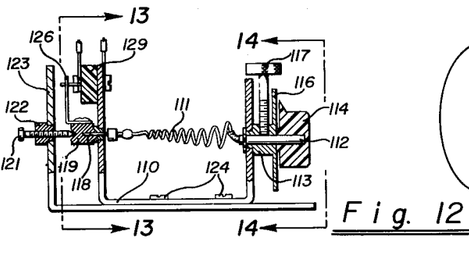
FIGURE 12 is a side elevational view with certain parts in cross-section of still another embodiment of my moisture sensing device.

The moisture sensing element may readily be incorporated in devices for closing switches, contacts and the like. One such embodiment is shown in FIGURES 12, 13 and 14 and consists of a U-shaped framework 110 which carries a moisture sensitive element 111 having its tail end attached to a shaft 112 rotatably mounted in a bearing block 113 carried by the member 110. A knob 114 is secured to the shaft and is disposed adjacent a dial 116. A thumb screw 117 is mounted in the bearing block 113 and is adapted to frictionally engage the shaft 112 for a purpose hereinafter described. The seed end of the tail-like appendage 111 is secured to the shaft 118 in a manner similar to that hereinbefore described in the previous embodiments. The shaft 118 is mounted in a bearing block 119 which is pivotally mounted on a screw 121 threadably mounted in a block 122 secured to a frame member 123. The frame member 123 is secured to the U-shaped frame 110 by suitable means such as screws 124.

A movable contact member 126 is mounted on the bearing block 119 and is adapted to engage either of two stationary contacts 127 and 128 mounted on insulating block 129. Connecting wires 131 and 132 are electrically connected to the stationary contacts 127 and 128 and a connecting wire 133 is connected to the movable contact 126.

Operation of the moisture sensitive device shown in FIGURES 12, 13 and 14 may now be briefly described as follows: Let it be assumed that it is desired to have the movable contact 126 move into engagement with the stationary contact 128 when a predetermined moisture condition arises. The thumb screw 117 is released and the knob 114 is rotated to the proper position after which the thumb screw 117 is set. As the moisture conditions in the air change, the moisture sensitive element 111 will coil or uncoil depending upon the condition arising and will cause the bearing block 119 and the movable contact 126 mounted thereon to be rotated in one direction or the other. When the predetermined moisture condition has been reached, the movable contact 126 will be moved into engagement with one of the stationary contacts 127 or 128 to close any electrical circuit connected to the wires 131, 132 and 133. Thus, it is readily apparent that the device can be utilized for energizing an alarm or other control devices.

Such a device has been found to be very sensitive and very accurate. The device can be set to close contacts upon reaching a predetermined moisture condition with a high degree of repeatability and accuracy.

Figures 15, 16, 17:
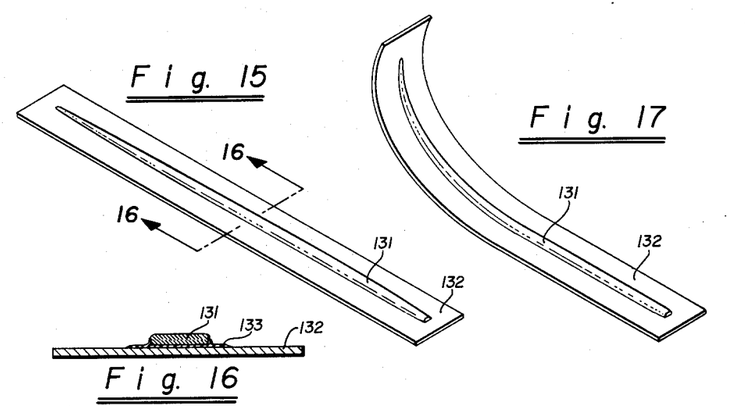
FIGURE 15 is an isometric view showing a moisture sensitive element mounted in a restrained position on a metal strip.
FIGURE 16 is a cross-sectional view taken along the line 16—16 of FIGURE 15.
FIGURE 17 is an isometric view showing the moisture sensitive element of FIGURE 15 having a different configuration from that shown in FIGURE 15 because of a change in the moisture absorbed by the moisture sensitive element.

My moisture sensitive element can also be used in the manner shown in FIGURES 15, 16 and 17 for closing contacts and performing other useful functions. In this embodiment of my moisture sensing device, the tail-like appendage is dried in a restrained condition. That is, the tail-like appendage is taken when completely saturated and allowed to dry in the flat state by placing it between two flat members. After the tail-like appendage is dried in this manner, the tail-like appendage is secured to a thin metal conducting strip 132 with a suitable adhesive such as Eastman 910. The tail-like appendage 131 is secured to the strip in such a manner that the layer which is relatively impervious to moisture is adjacent the metal strip and the layer which is relatively sensitive to moisture is exposed to the atmosphere. The strip 132 is relatively thin material such as one mil in thickness and is formed of a suitable material such as brass. As the moisture content in the surrounding air changes, the metal strip to which the tail-like appendage is secured changes its configuration in a manner similar to that shown in FIGURE 17.

The tail-like appendage also may be secured to the metal strip in a wet state. When secured in a dry state, the metal strip will be bent in a direction away from the tail-like appendage whereas when secured in the wet state it will be bent in a direction toward the tail-like appendage as shown in FIGURE 17.

Figure 18:
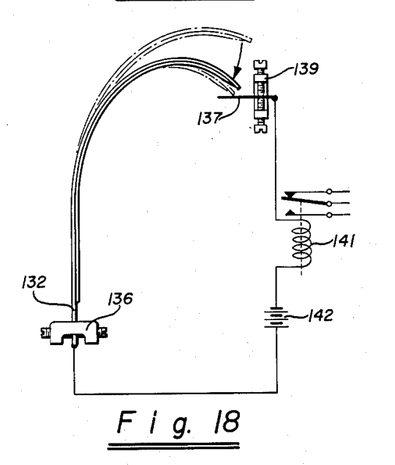
FIGURE 18 is a view, partially schematic, showing another embodiment of my moisture sensitive device incorporating the restrained moisture sensitive element shown in FIGURES 15, 16 and 17.

The use of such an assembly for opening and closing contacts is shown in FIGURE 18 in which one end of the strip 132 is secured to a block 136. The other end of the strip is adapted to engage a contact 137 carried by a mounting block 139. When the contact 137 engages one end of the metal strip 132 and establishes a circuit through a relay 141 for a battery 142 it is readily apparent that various functions can be performed by such an assembly. It is also readily apparent that such an assembly can be calibrated so that it will open or close contacts when a predetermined moisture content in the surrounding air has been reached.

Figure 19:
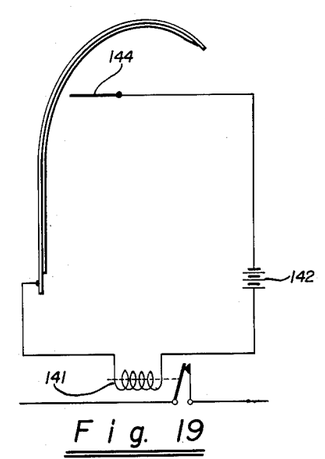
FIGURE 19 is another view, partially schematic, showing another moisture sensitive device similar to that shown in FIGURE 18.

In FIGURE 19 I have shown an embodiment similar to that shown in FIGURE 18 with the exception that the contact 144 has been placed in a different position which makes it possible to more accurately calibrate the device.

Another embodiment of my moisture sensing device is shown in FIGURES 20–23 and consists of a cylindrical housing 151 which is provided with elongate slots 152 extending longitudinally of the housing adjacent the lower portion of the housing. The slots are spaced circumferentially of the housing as shown particularly in FIGURE 21. A U-shaped support bracket 150 is disposed within the housing and is affixed to the housing by suitable means such as the screw 153. A gear box having a suitable reduction ratio such as 30:1 is mounted upon the upper ends of the support bracket 150 by suitable means such as bolts 156. Another U-shaped bracket 157 is mounted on the gear box 154 by the same bolts 156.

Figures 20, 21, 22, 23:
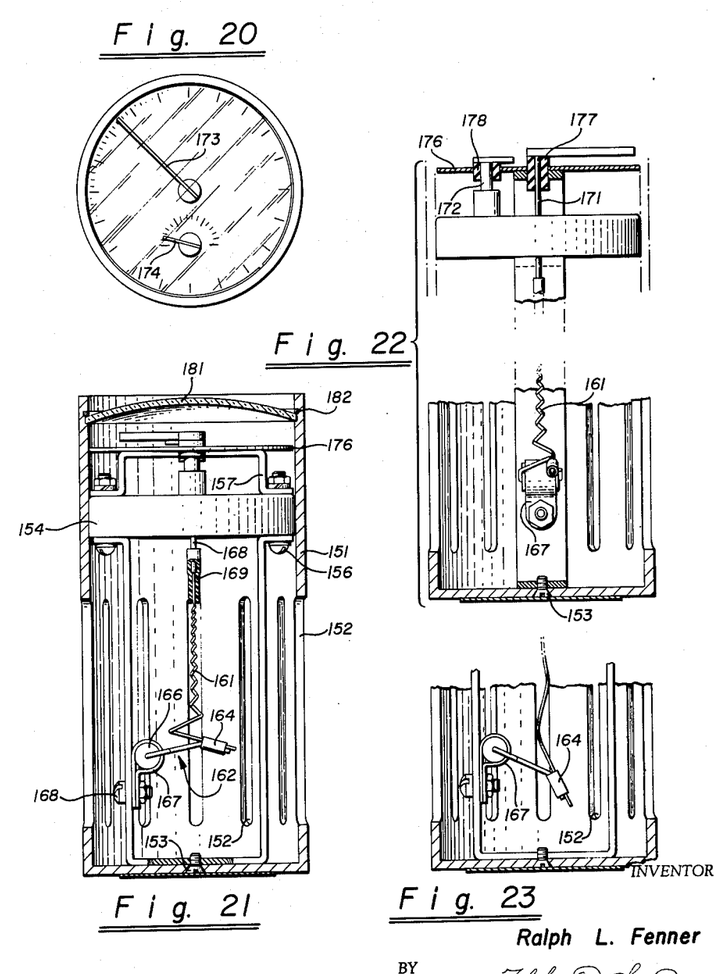
FIGURE 20 is a plan view of still another embodiment of my moisture sensing device.
FIGURE 21 is a cross-sectional side elevational view of the moisture sensing device as shown in FIGURE 20.
FIGURE 22 is a view, partially fragmentary, at right angles to the view in FIGURE 21.
FIGURE 23 is a partial cross-sectional view of the lower portion of the moisture sensing device with the moisture sensitive element in an unwound condition.

A moisture sensing element 161 similar to that hereinbefore described is disposed in the lower portion of the housing 151 and has its tail end attached to an assembly 162 which accommodates the longitudinal expansion and contraction of the moisture sensing element 161 as it winds and unwinds. This assembly, as shown in FIGURES 21 and 22, consists of an arm 162 which has one end fixed to the tail end of the moisture sensing element 161 by irradiated plastic tubing 164 which has been slipped over the end of the arm and the tail end of the moisture sensing element 161 and heated to cause it to contract to form a tight connection between the arm 162 and the moisture sensing element 161. The other end of the arm 162 is pivotally mounted in a bearing member 166 of suitable material such as Teflon. This bearing member 166 is carried by a bracket 167 secured to the supporting bracket 150 by a bolt 168.

The seed end or other end of the moisture sensing element 161 is secured to the input shaft 168 of the gear box 154 by irradiated plastic tubing 169 which has been slipped over the input shaft and the seed end of the moisture sensing element and heated to cause the tubing to contract to form an excellent connection between the moisture sensing element 161 and the input shaft 168.

The gear box 154 is provided with two output shafts 171 and 172. The gearing in the gear box is arranged so that the shaft 171 makes one complete turn for every increment of advance of the shaft 172. For that reason, a decimal pointer 173 is secured to the shaft 171 and a full turns pointer 174 is mounted on the shaft 172. The pointers 173 and 174 overlie a dial face 176 which is secured to the bracket 157. The shafts 171 and 172 are rotatably mounted in bearings 177 and 178 mounted in the dial face. A dial face glass 181 is mounted in the upper end of the housing and is retained therein by keeper ring 182.

Operation of this embodiment of my invention is very similar to that of the embodiments hereinbefore described. It will be noted, however, that the means for mounting the tail end of the moisture sensing element 161 is quite different from the means hereinbefore described. As can be seen particularly from FIGURE 23, the assembly is such that it readily accommodates the longitudinal expansion of the moisture sensing element as it unwinds, while at the same time preventing rotation of the tail end of the moisture sensitive element. The arm 163 permits the expansion and contraction of the moisture sensitive element very readily, while at the same time retaining the tail end of the moisture sensitive element in more or less general alignment with the centrally disposed input shaft 168 to the gear box 154.

It is apparent from the foregoing that I have provided a new and improved moisture sensing device which has many new and important applications. As explained, it can be utilized for making moisture determinations in all ranges. For example, it can be utilized for measuring the moisture content in trees or logs or the moisture content in soil to determine the optimum moisture content for growth of plants and the like. In addition, the moisture sensing device can be utilized for actuating alarms, pumps, valves or other types of devices.

Although direct indicating type devices have been disclosed, it is readily apparent that, if desired, other types of readout can be provided with very little difficulty. For example, it is well within the skill of anyone in the art to provide a digital or analog output from any of the devices if desired. In the same manner, a strip chart recording device can also be provided.

I claim:

1. In a moisture measuring device, a housing, a gear train mounted in said housing, an indicator connected to the gear train and adapted to be driven by the gear train, the gear train including a rotatable shaft for driving the same, a moisture sensitive element consisting of the tail-like appendage of the seed of the genus Erodium, said moisture sensitive element being characterized in that as it winds and unwinds, it expands and contracts longitudinally, said housing having openings therein to permit air to circulate over the moisture sensitive element, means for securing one end of the element to the rotatable shaft, an arm, means for connecting the other end of the moisture sensitive element to the arm, means mounted within the housing for pivotally mounting the other end of the arm to prevent rotation of said other end of said moisture sensitive element and to permit movement of said other end of the moisture sensitive element in a direction longitudinally of the moisture sensitive element and to thereby maintain said moisture sensitive element free of forces tending to stress said element longitudinally.

2. In a moisture sensing device, a housing, a moisture sensitive element disposed in said housing and being characterized in that with changing moisture conditions, it winds and unwinds and contracts and expands longitudinally, said housing having openings therein to permit air to circulate over the element, a shaft rotatably mounted in the housing, means for fastening one end of the element to the shaft, said shaft extending away from said element in a direction substantially in alignment with the element, the other portions of said shaft being free of engagement with said element, means connected to the shaft for indicating the position of the shaft as it is rotated by the element, and means mounted on the other end of the element in the housing to prevent rotational movement of the same but to permit longitudinal movement of the same, said last named means being characterized in that it is formed to maintain said element free of forces tending to stress said element longitudinally, said last named means consisting of an arm, one end of said arm being affixed to the other end of said element, and means pivotally mounting the other end of said arm in said housing.

3. A moisture sensing device as in claim 2 wherein said means for securing the arm to the other end of said element consists of irradiated plastic tubing and wherein said means securing said one end of the element to the shaft consists of irradiated plastic tubing.

4. In a moisture sensing device, a moisture sensitive element consisting solely of a tail-like appendage of the seed of the genus Erodium, said element being characterized in that as it unwinds and winds, it expands and contracts longitudinally, a fixed member, a rotatable member mounted in a predetermined position with respect to said fixed member, means securing one end of said appendage to one of said members and securing the other end of said element to the other of said members, said last named means being characterized in that it is formed to accommodate the longitudinal expansion and contraction of the element as it winds and unwinds and also in that it is formed to maintain said element free of forces tending to stress said element longitudinally of the same, said last named means also being characterized in that the end of the element secured to the fixed member is prevented from rotating, said last named means including a male forked member and female means cooperatively engaging the male forked member and sliding longitudinally of the forked member, indicating means, and means connecting the rotatable member to the indicating means.

5. A moisture sensing device as in claim 4 wherein said means connecting said rotatable member to said indicating means includes a gear train.

6. In a moisture measuring device, a housing, a moisture sensitive element consisting of the tail-like appendage of the seed of the genus Erodium disposed in said housing, said element being characterized in that as it winds and unwinds, it expands and contracts longitudinally, said housing having openings therein to permit air to circulate over the element, a shaft rotatably mounted in the housing, means securing one end of said element to said housing to prevent rotational movement of said one end of said element and for securing the other end of said element to said shaft, said shaft extending away from said element in a direction substantially in alignment with the element so that the other portions of said shaft are out of engagement with said element, said last named means being characterized in that it is formed to accommodate the longitudinal expansion and contraction of the element and in that it is also formed to maintain said element free of forces tending to stress said element longitudinally, said last named means including an arm, means connecting one end of the arm to said element and means for pivotally mounting said arm in said housing, and means for indicating the position of the shaft as it is rotated by the element.

(References on following page)

References Cited by the Examiner

UNITED STATES PATENTS

| | | | |
|---|---|---|---|
| 20,326 | 5/58 | Clarke | 73—337.5 |
| 25,457 | 9/59 | Ullman | 73—337.5 |
| 51,477 | 12/65 | Rand | 73—337.5 |
| 1,336,380 | 4/20 | Sampietro | 73—337.5 |
| 1,712,204 | 5/29 | Gibney | 73—337.5 X |
| 2,430,737 | 11/47 | Roe | 85—2.4 |
| 2,481,142 | 9/49 | Mueller | 85—2.4 |
| 2,497,378 | 2/50 | Talbott | 73—337.5 |
| 2,573,685 | 11/51 | Blinn et al. | 73—337 |
| 2,856,774 | 10/58 | Dean | 73—337.5 |

FOREIGN PATENTS

| | | |
|---|---|---|
| 170,292 | 10/21 | Great Britain. |

RICHARD C. QUEISSER, *Primary Examiner.*

ROBERT L. EVANS, DAVID SCHONBERG,
*Examiners.*